Sept. 30, 1924.  
W. H. DAY  
MACHINE FOR MOLDING NIGHT LIGHTS  
Filed April 9, 1923  
1,510,210  
3 Sheets-Sheet 3

INVENTOR.  
William Harper Day.  
by Arthur J. Urhaus  
Attorney

Patented Sept. 30, 1924.

1,510,210

UNITED STATES PATENT OFFICE.

WILLIAM HARPER DAY, OF HOUNSLOW, ENGLAND.

MACHINE FOR MOLDING NIGHT LIGHTS.

Application filed April 9, 1923. Serial No. 630,973.

*To all whom it may concern:*

Be it known that I, WILLIAM HARPER DAY, a subject of the King of Great Britain and Ireland, residing at The Novelty Works, Ivy Road, Hounslow, Middlesex, England, have invented new and useful Improvements in and Relating to Machines for Molding Night Lights, of which the following is a specification.

The present invention relates to machines for molding tapering night lights. Such night lights usually have their upper surface moulded and marked with the maker's name or trade mark. At present such night lights are moulded in the same fashion as candles, that is to say, they are moulded with their tops upward, and are removed from the moulds by means of pistons. The wicks are not moulded in, but suitable holes are formed after molding by forcing perforating pins through the night lights and the wicks afterwards inserted separately. Owing to the rounded and marked form of the upper surface of the night lights, detachable covers are necessary for the tops of the moulds, correspondingly shaped on their inner surfaces. In order to shape as much as possible of the night light top, these covers must enclose the moulds as much as possible, but on the other hand a central opening must be left for the wax to flow in. Moreover, the wax sets very rapidly, and to ensure proper filling of the moulds, these openings should be as large as possible, so that the good shape of the night light has to be partially sacrificed. A further disadvantage of this method is that when the night lights are pushed out of the moulds by the pistons, the covers adhere and have to be knocked off and then replaced on the moulds by hand. As the molding machines are usually to mould several hundred night lights at once, it will be seen that considerable time is thus wasted. Further, since the covers are usually made of tin, which is a soft metal, in being knocked off the night lights, they are easily damaged and are expensive to replace. Finally, considerable force is necessary in perforating the wick holes.

The present invention is designed to avoid all these disadvantages by molding the night lights the opposite way up. Instead of pistons carried on a plate beneath the moulds, the plate now carries a series of members corresponding with the covers, with the important advantage that they now cover the whole surface, as no filling openings have to be left in them. The tops of the moulds which form the plain flat butt ends of the night lights are left quite open so that the maximum filling area is obtained. Core pins are carried on a lower plate, and pass centrally through the cover members which take the place of the pistons and are placed in position before the moulds are filled. The present invention further provides means for raising and lowering either plate independently of the other, or both together, from one handle, these features being made use of in removing the night lights from the moulds, as will be seen later herein.

One form of machine embodying the present invention is shown in the accompanying drawings in which—

Figure 1:
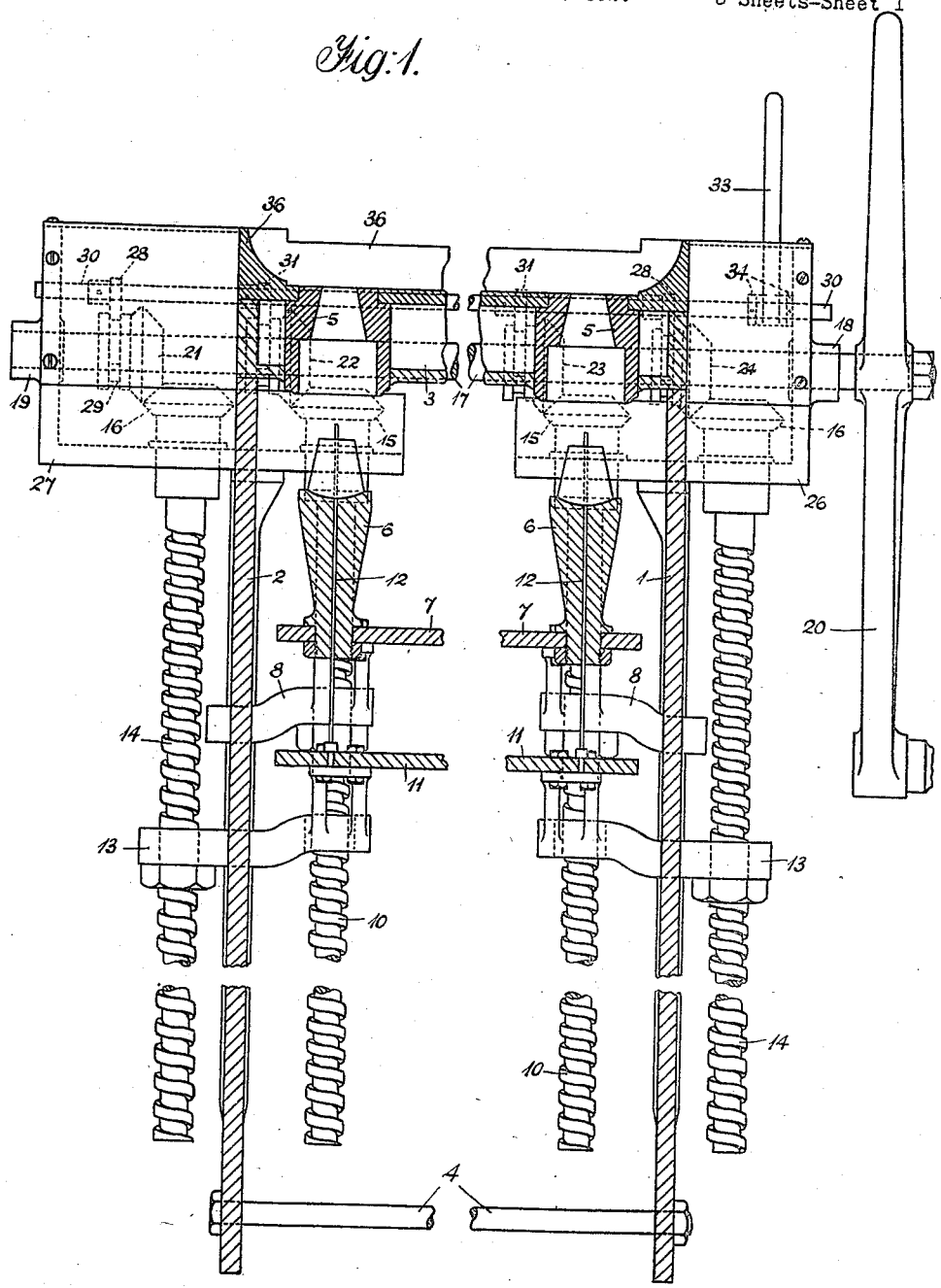
Figure 1 shows juxtaposed sectional views of the two ends of the machine, the section being through one of the rows of moulds.
Figure 2:
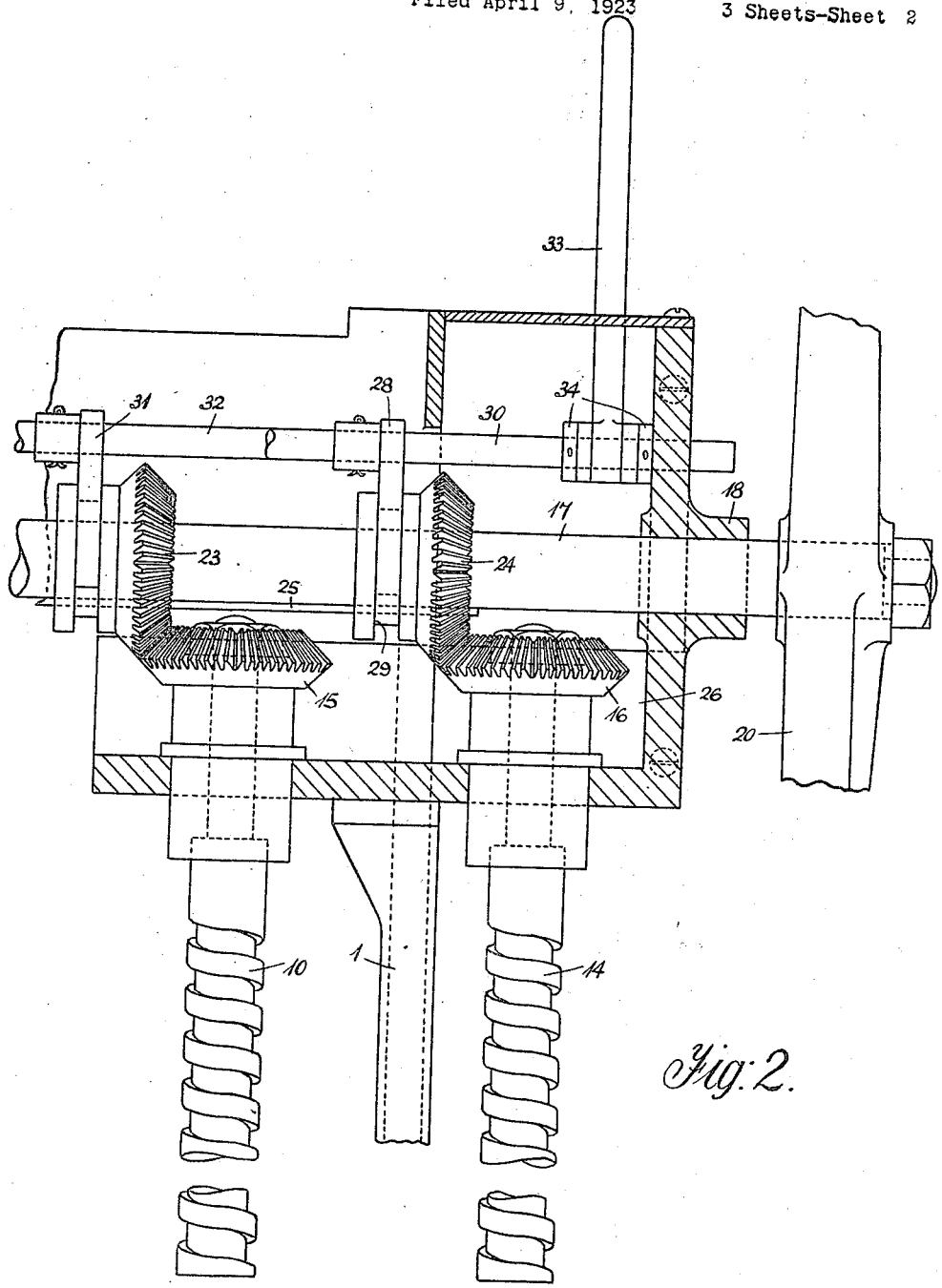
Figure 2 is a sectional view on an enlarged scale of the box containing the gear for controlling the raising and lowering of the plates.
Figure 3:
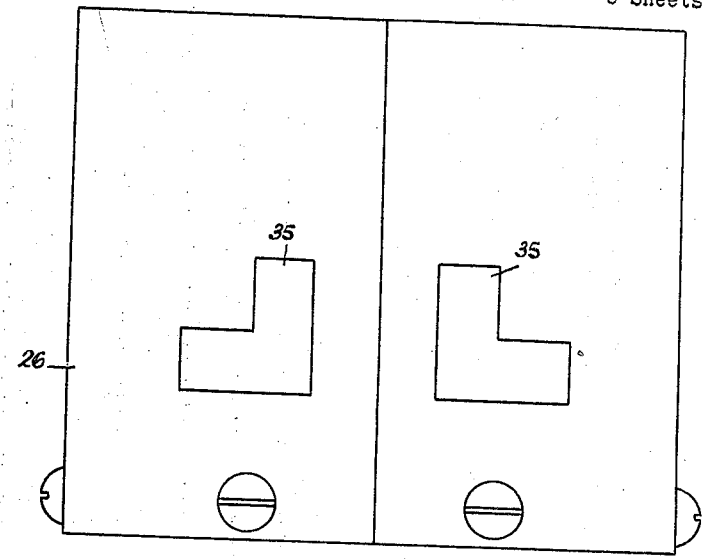
Figure 3 shows a plan view of the box shown in Figure 2.
Figure 4:
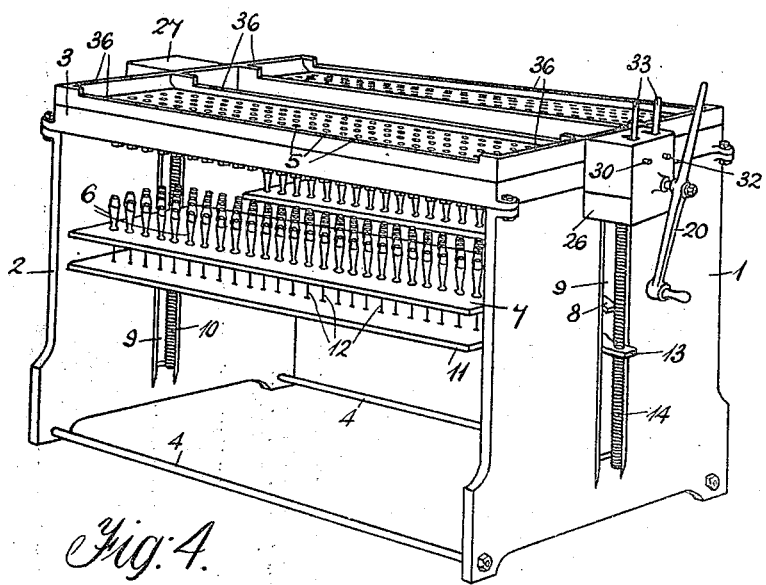
Figure 4 shows a perspective view of the complete machine.

The machine comprises end plates or standards, 1, 2, united at their upper ends by a mould box 3 and at their lower ends by tie bars 4. As usual, the mould box 3 is hollow, so that water can be circulated round the moulds 5 set therein. The mould box is made in two parts, arranged in either side of the machine, the plate lifting mechanism being situated in the space between. The moulds 5 are arranged in a number of rows, so that one machine holds a considerable number, several hundred being contained in a machine of easily manageable size. Axially beneath the moulds 5 cover members 6 are mounted on an upper plate 7. The cover members 6 are hollowed in their upper surfaces and suitable devices or characters formed thereon so as to mould the tops of the night lights to the desired shape. The upper plate 7 is provided with end pieces 8 working in guiding slots 9 formed in the end plates 1 and 2, and is raised or lowered by means of a screw 10 at each end. A lower plate 11 carries core pins 12 slidably fitting in axial holes in the cover members 6. The lower plate 11 is provided with end pieces 13 working in the guiding slots 9 and is raised or lowered by means of a screw 14 at each end. The upper ends of the screws 10 and 14 are provided respectively with bevel gears 15 and 16. A shaft 17 runs the whole length of the machine and is carried in suitable bearings 18 and 19. A handle 20 is provided for rotating this shaft 17, which carries slidably mounted on it bevel gears 21, 22, 23 and 24, keys such as 25 (Figure 2) being provided so that the shaft 17 drives these bevel gears. The ends of the machine are extended as far as necessary to accommodate the gear, forming boxes 26 and 27. The sliding motion of the gears 21 and 24 is controlled by a pair of forks 28 working in grooves 29 in the bodies of the gears, the forks 28 being mounted on a rod 30 slidably carried in the ends of the boxes 26 and 27. The pair of gears 22 and 23 are similarly controlled by forks 31 on a rod 32. The rods 30 and 32 are moved by handles 33, the handles being rotatably carried on the rods between fixed collars 34. The motion of the handles 33 is limited by slots 35 in the top of the box 26, so that the gears 21, 24 and 22, 23, can be respectively engaged or disengaged with the gears 16 and 15. To take the end thrust tending to disengage the gears when they are in the engaged position, the handles 33 are swung sideways into the notches formed at the corresponding ends of the slots 35 shown in Figure 3. It will be seen that by engaging the proper gears by means of the handles 33, either of the plates 7 or 11 can be raised or lowered independently of the other, or by engaging both sets of gears at once, the plates may be raised or lowered together simply by rotation of the single handle 20. It will be obvious that the screws 10 and 14 must be of the same pitch and to the same hand.

The machine is operated in the following manner: The plates are raised so that the cover members 6 are in their highest position when they abut the shoulders formed in the lower part of the moulds 5, and so that the ends of the core pins are just below the upper surface of the mould box 3 so as not to interfere with squaring off the butt ends of the night lights. The moulds are then filled with molten wax, sufficient being run in to overflow the moulds somewhat. Raised edges 36 on the mould box 3, prevent the wax from running onto the floor. When the wax has set, the overflow is out of flush with the top of the mould box leaving the butts of the finished night lights flush with the top of said box. The overflow wax is of course returned to the melting pot for further use. The lower plate is then raised somewhat so that the core pins project through the butt ends of the night lights, thus completing the wick holes. The two plates are then lowered together, the weight of the plates, cover member and night lights considerably aiding the operator. The grip of the night lights on the core pins and the adhesion to the cover members will in most cases ensure that the night lights leave the moulds, especially since they are tapered, and once released from the sides of the mould are quite free. When the two plates have been lowered sufficiently to render the night lights easily accessible, the core pin plate is lowered still further to withdraw the core pins entirely from the night lights, which are then easily removed from the cover members.

What I claim is:—

1. A machine for molding tapered night lights comprising stationary end plates, a mould box joining said end plates, a series of inverted moulds in said mould box, a series of vertically movable mould covers adapted to be raised to a position to close the open mouths of said inverted moulds, a corresponding series of core-pins adapted to be positioned within said moulds and means for withdrawing said mould covers and said core-pins from said moulds with the finished night lights adhering to said covers and said pins.

2. A machine for molding tapered night lights comprising stationary end plates, a mould box joining said end plates, a series of inverted moulds in said mould box, a movable plate, a series of mould covers mounted on said plate corresponding with said inverted moulds, a lower plate, core-pins mounted on said lower plate corresponding with and adapted to project through said mould covers and means for raising said plates to position said mould covers over the mouths of said moulds and said core-pins within said moulds and for lowering said plates with the finished night lights adhering to said mould covers and said pins.

3. A machine for molding tapered night lights comprising stationary end plates, a mould box joining said end plates, a series of inverted moulds in said mould box, a movable plate, a series of mould covers mounted on said plate corresponding with said inverted moulds, a lower plate, core-pins mounted on said lower plate corresponding with and adapted to project through said mould covers and means for raising said plates independently or together to position said mould covers over the mouths of said moulds and said core-pins within said moulds and for lowering said plates with the finished night lights adhering to said mould covers and said pins.

4. A machine for molding tapered night lights comprising stationary end plates, a mould box containing said end plates, a series of inverted moulds in said mould box, an upper movable plate below said moulds, a series of mould covers mounted on said plate, means for raising or lowering said movable upper plate, a lower movable plate below said upper plate, core-pins mounted on said lower plate adapted to slide axially through said lower plate, vertical screws co-acting with said lower plate carried in bearings in said mould box, and means for rotating said screws.

5. A machine for molding tapered night lights comprising stationary end plates, a mould box joining said end plates, a series of inverted moulds in said mould box, an upper movable plate below said moulds, a series of mould covers mounted on said plate, vertical screws co-acting with said upper plate carried in bearings in said mould box, means for rotating said screws, a lower movable plate below said upper plate, core-pins mounted on said lower plate adapted to slide axially through said cover members, other vertical screws co-acting with said lower plate carried in bearings in said mould box, and means for rotating said screws.

6. A machine for molding tapered night lights, comprising a pair of end plates, a hollow mould box joining said end plates, inverted moulds in said mould box, an upper movable plate below said moulds, co-acting guiding means on said upper plate and said end plates, cover members adapted to register with and close said moulds mounted on said upper plate, a lower movable plate below said upper plate, co-acting guiding means on said lower plate and said end plates, core pins adapted to slide axially through said cover members, vertical screws co-acting with said upper plate carried in bearings in said mould box, other vertical screws co-acting with said lower plate carried in bearings in said mould box, and means for rotating said two groups of screws independently or together.

7. A machine for molding tapered night lights, comprising a pair of end plates, a hollow mould box joining said end plates, inverted moulds in said mould box, an upper movable plate below said moulds, co-acting guiding means on said upper plate and said end plates, cover members adapted to register with and close said moulds mounted on said upper plate, a vertical screw at each end co-acting with said upper plate carried in bearings in said mould box, a horizontal shaft extending through the machine carried in bearings in said mould box, bevel gears on said vertical screws and said horizontal shaft, means for sliding said gears into and out of engagement, means for rotating said horizontal shaft, a lower movable plate below said upper plate, co-acting guiding means on said lower plate and said end plates, core pins adapted to slide axially through said cover members and means for raising or lowering said lower plate.

8. A machine for molding tapered night lights, comprising a pair of end plates, a hollow mould box joining said end plates, inverted moulds in said mould box, an upper movable plate below said moulds, co-acting guiding means on said upper plate and said end plates, cover members adapted to register with and close said moulds mounted on said upper plate, means for raising or lowering said upper plate, a lower movable plate below said upper plate, co-acting guiding means on said lower plate and said end plates, core pins adapted to slide axially through said cover members, a vertical screw at each end co-acting with said lower plate carried in bearings in said mould box, a horizontal shaft extending through the machine carried in bearings in said mould box, bevel gears on said vertical screws and said horizontal shaft, means for sliding said gears into and out of engagement, and means for rotating said horizontal shaft.

9. A machine for molding tapered night lights, comprising a pair of end plates, a hollow mould box joining said end plates, inverted moulds in said mould box, an upper movable plate below said moulds, co-acting guiding means on said upper plate and said end plates, cover members adapted to register with and close said moulds mounted on said upper plate, a lower movable plate below said upper plate, co-acting guiding means on said lower plate and said end plates, core pins adapted to slide axially through said cover members, a vertical screw at each end co-acting with said upper plate carried in bearings in said mould box, a second vertical screw at each end co-acting with said lower plate carried in bearings in said mould box, a horizontal shaft extending through the machine carried in bearings in said mould box, bevel gears on both said pairs of vertical screws and on said horizontal shaft, means for independently sliding either of said groups of bevel gears into and out of engagement, and means for rotating said horizontal shaft.

10. A machine for molding tapered night lights, comprising a pair of end plates, tie rods and a hollow mould box joining said end plates, an upper movable plate below said moulds, guiding members at the ends of said upper plate adapted to work in guiding slots in said end plate, cover members adapted to register with and close said moulds mounted on said upper plate, a lower movable plate below said upper plate, guiding members at the ends of said lower plate adapted to work in guiding slots in said end plates, core pins adapted to slide axially through said cover members mounted on said lower plate, a vertical screw at each end inside said end plates co-acting with said upper plate carried in bearings in said mould box, a second vertical screw at each end outside said end plates co-acting with said lower plate carried in bearings in said mould box, bevel gears attached to all said screws, a horizontal shaft extending through the machine carried in bearings in said mould box, a bevel gear for each screw slidably mounted on and driven by said horizontal shaft, a sliding horizontal rod extending through the machine carried in bearings in said mould box, a pair of forks on said sliding horizontal rod engaging groves in said sliding bevel gears corresponding to said bevel gears on said first pair of vertical screws, a second sliding horizontal rod extending through the machine carried in bearings in said mould box, a pair of forks on said second sliding horizontal rod engaging grooves in said sliding bevel gears corresponding to said bevel gears on said second pair of vertical screws, a slotted cover in said mould box, a handle working through slots in said slotted cover shaped so as to retain the handle against any thrust in the engaged position on each of said horizontal rods adapted to move said rods so that its corresponding set of bevel gears may be engaged or disengaged, and an operating handle on said horizontal shaft.

In witness whereof I have signed my name to this specification.

WILLIAM HARPER DAY